United States Patent
Lindskog

(10) Patent No.: US 12,092,717 B2
(45) Date of Patent: Sep. 17, 2024

(54) FEEDBACK SECURED WIRELESS RANGING

(71) Applicant: Samsung Electronics Co., Ltd., Suwon-si (KR)

(72) Inventor: Erik David Lindskog, Cupertino, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 368 days.

(21) Appl. No.: 17/527,980

(22) Filed: Nov. 16, 2021

(65) Prior Publication Data

US 2022/0187434 A1 Jun. 16, 2022

Related U.S. Application Data

(60) Provisional application No. 63/273,767, filed on Oct. 29, 2021, provisional application No. 63/125,773, filed on Dec. 15, 2020.

(51) Int. Cl.
*G01S 11/02* (2010.01)
*G07C 9/00* (2020.01)

(52) U.S. Cl.
CPC .......... *G01S 11/02* (2013.01); *G07C 9/00309* (2013.01); *G07C 2009/00769* (2013.01)

(58) Field of Classification Search
CPC .......... G01S 11/02; G07C 9/00309; G07C 2009/00769; H04W 12/08; H04W 12/122; H04L 43/08; H04L 27/2695; H04L 1/0083; H04L 63/10; H04B 17/309
USPC .......................................... 340/5.61
See application file for complete search history.

(56) References Cited

U.S. PATENT DOCUMENTS

| | | | |
|---|---|---|---|
| 6,219,334 B1 * | 4/2001 | Sato | H04L 27/2647 375/232 |
| 8,345,623 B2 | 1/2013 | Chen et al. | |
| 8,345,659 B2 | 1/2013 | Chen et al. | |
| 9,107,226 B2 | 8/2015 | Calcev et al. | |
| 9,240,995 B1 * | 1/2016 | Howe | H04L 63/10 |
| 10,158,997 B2 * | 12/2018 | Marquez | H04L 69/22 |
| 11,057,743 B2 | 7/2021 | Burowski et al. | |
| 11,496,384 B2 * | 11/2022 | Lindskog | H04L 43/0864 |
| 11,589,207 B2 * | 2/2023 | Han | H04W 8/005 |
| 11,716,701 B2 * | 8/2023 | Manolakos | H04W 64/006 370/329 |
| 2007/0276943 A1 | 11/2007 | Marez et al. | |

(Continued)

OTHER PUBLICATIONS

European Search Report for European Application No. 21213683.2 dated Mar. 18, 2022, 8 pages.

*Primary Examiner* — Nam V Nguyen
(74) *Attorney, Agent, or Firm* — Lewis Roca Rothgerber Christie LLP

(57) ABSTRACT

A system and method for ranging secured by feedback of one or more channel metrics. The method may include: receiving, by a first modem, a first training signal, from a second modem; generating, by the first modem, a first estimate of a channel metric, based on the first training signal; receiving, by the first modem, from the second modem, a second estimate of the channel metric; determining, by the first modem, that the first estimate of the channel metric and the second estimate of the channel metric do not meet a similarity criterion; and denying, by the first modem, access to a resource.

20 Claims, 5 Drawing Sheets

(56) References Cited

U.S. PATENT DOCUMENTS

| | | | |
|---|---|---|---|
| 2009/0167604 A1* | 7/2009 | Roberts | H04B 7/0617 |
| | | | 342/368 |
| 2016/0227516 A1* | 8/2016 | Nallampatti Ekambaram | ............ |
| | | | H04L 27/2659 |
| 2019/0036739 A1 | 1/2019 | Lindskog et al. | |
| 2019/0162843 A1* | 5/2019 | Jiang | H04W 24/10 |
| 2019/0182674 A1 | 6/2019 | Li et al. | |
| 2020/0355785 A1* | 11/2020 | Li | G01S 5/06 |

* cited by examiner

| Category | Public Action | Dialog Token | TOD | TOA | TOD Error | TOA Error |
|---|---|---|---|---|---|---|
| 1 | 1 | 6 | 6 | 6 | 1 | 1 |

Octets

| CFO Parameter | R2I NDP Tx Power | I2R NDP Target RSSI | Secure LTF Parameters (Optional) | AOA Feedback (Optional) | PSTOA (Optional) | PSTOA Error (Optional) |
|---|---|---|---|---|---|---|
| 2 | 1 | 1 | 13 | 9 | 6 | 1 |

Octets

The last three columns (Secure LTF Parameters, AOA Feedback, PSTOA, PSTOA Error) are grouped as 410.

FIG. 4

FEEDBACK SECURED WIRELESS RANGING

CROSS-REFERENCE TO RELATED APPLICATION(S)

The present application claims priority to and the benefit of U.S. Provisional Application No. 63/125,773, filed Dec. 15, 2020, entitled "FEEDBACK SECURED WI-FI RANGING", and the present application claims priority to and the benefit of U.S. Provisional Application No. 63/273,767, filed Oct. 29, 2021, entitled "FEEDBACK SECURED WI-FI RANGING", the entire contents of both of which are incorporated herein by reference.

FIELD

One or more aspects of embodiments according to the present disclosure relate to wireless communications, and more particularly to a system and method for secure ranging between modems.

BACKGROUND

In some circumstances wireless communications may be used to control access to a resource. For example, a vehicle with a first wireless modem may unlock its doors and permit the engine to be started when it detects, through a wireless interaction, that a second wireless modem (presumed to be in the possession of the vehicle's owner) is sufficiently close to the vehicle, as determined by a ranging operation. Such a system may be vulnerable to unauthorized access unless measures are in place to prevent an adversary from mimicking the second modem, and altering the measured range, in the ranging operation.

Thus, there is a need for a system and method for secure ranging between modems.

SUMMARY

According to an embodiment of the present disclosure, there is provided a method, including: receiving, by a first modem, a first training signal, from a second modem; generating, by the first modem, a first estimate of a channel metric, based on the first training signal; receiving, by the first modem, from the second modem, a second estimate of the channel metric; determining, by the first modem, that the first estimate of the channel metric and the second estimate of the channel metric do not meet a similarity criterion; and denying, by the first modem, access to a resource.

In some embodiments, the method further includes sending, by the first modem, a second training signal, wherein the second estimate of the channel metric is based on the second training signal.

In some embodiments, the method further includes generating, by the second modem, the second estimate of the channel metric.

In some embodiments, the first estimate of the channel metric is based on a first estimate of a first channel characteristic and a first estimate of a second channel characteristic.

In some embodiments, the first estimate of the first channel characteristic is an estimated time of arrival of the first training signal.

In some embodiments, the first estimate of the second channel characteristic is an estimated phase shift time of arrival of the first training signal.

In some embodiments, the first estimate of the channel metric is a measure of the difference between the estimated time of arrival of the first training signal and the estimated phase shift time of arrival of the first training signal.

In some embodiments: the second estimate of the channel metric is a measure of the difference between the estimated time of arrival of a second training signal and the estimated phase shift time of arrival of the second training signal, the second training signal being a training signal sent by the first modem and received by the second modem; and the similarity criterion is a criterion that is not met when the difference between the first estimate of the channel metric and the second estimate of the channel metric exceeds a set threshold.

In some embodiments, the first estimate of the second channel characteristic is a mean of a plurality of elements of an estimated channel frequency response.

In some embodiments, the first estimate of the second channel characteristic is a standard deviation of a plurality of elements of an estimated channel frequency response.

According to an embodiment of the present disclosure, there is provided a system, including: a first modem, including: a radio; and a processing circuit, the processing circuit being configured to: receive a first training signal, from a second modem; generate a first estimate of a channel metric, based on the first training signal; receive, from the second modem, a second estimate of the channel metric; determine that the first estimate of the channel metric and the second estimate of the channel metric do not meet a similarity criterion; and deny access to a resource.

In some embodiments, the processing circuit is further configured to send a second training signal, wherein the second estimate of the channel metric is based on the second training signal.

In some embodiments, the system further includes the second modem, the second modem being configured to generate the second estimate of the channel metric.

In some embodiments, the first estimate of the channel metric is based on a first estimate of a first channel characteristic and a first estimate of a second channel characteristic.

In some embodiments, the first estimate of the first channel characteristic is an estimated time of arrival of the first training signal.

In some embodiments, the first estimate of the second channel characteristic is an estimated phase shift time of arrival of the first training signal.

In some embodiments, the first estimate of the channel metric is a measure of the difference between the estimated time of arrival of the first training signal and the estimated phase shift time of arrival of the first training signal.

In some embodiments: the second estimate of the channel metric is a measure of the difference between the estimated time of arrival of a second training signal and the estimated phase shift time of arrival of the second training signal, the second training signal being a training signal sent by the first modem and received by the second modem; and the similarity criterion is a criterion that is not met when the difference between the first estimate of the channel metric and the second estimate of the channel metric exceeds a set threshold.

In some embodiments, the first estimate of the second channel characteristic is a mean of a plurality of elements of an estimated channel frequency response.

According to an embodiment of the present disclosure, there is provided a system, including: a first modem, including: a radio; and means for processing, the means for processing being configured to: receive a first training signal, from a second modem; generate a first estimate of a channel metric, based on the first training signal; receive, from the second modem, a second estimate of the channel metric; determine that the first estimate of the channel metric and the second estimate of the channel metric do not meet a similarity criterion; and deny access to a resource.

BRIEF DESCRIPTION OF THE DRAWINGS

These and other features and advantages of the present disclosure will be appreciated and understood with reference to the specification, claims, and appended drawings wherein:

FIG. 4 is a frame structure diagram, according to an embodiment of the present disclosure.

DETAILED DESCRIPTION

The detailed description set forth below in connection with the appended drawings is intended as a description of exemplary embodiments of a system and method for secure ranging between modems provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
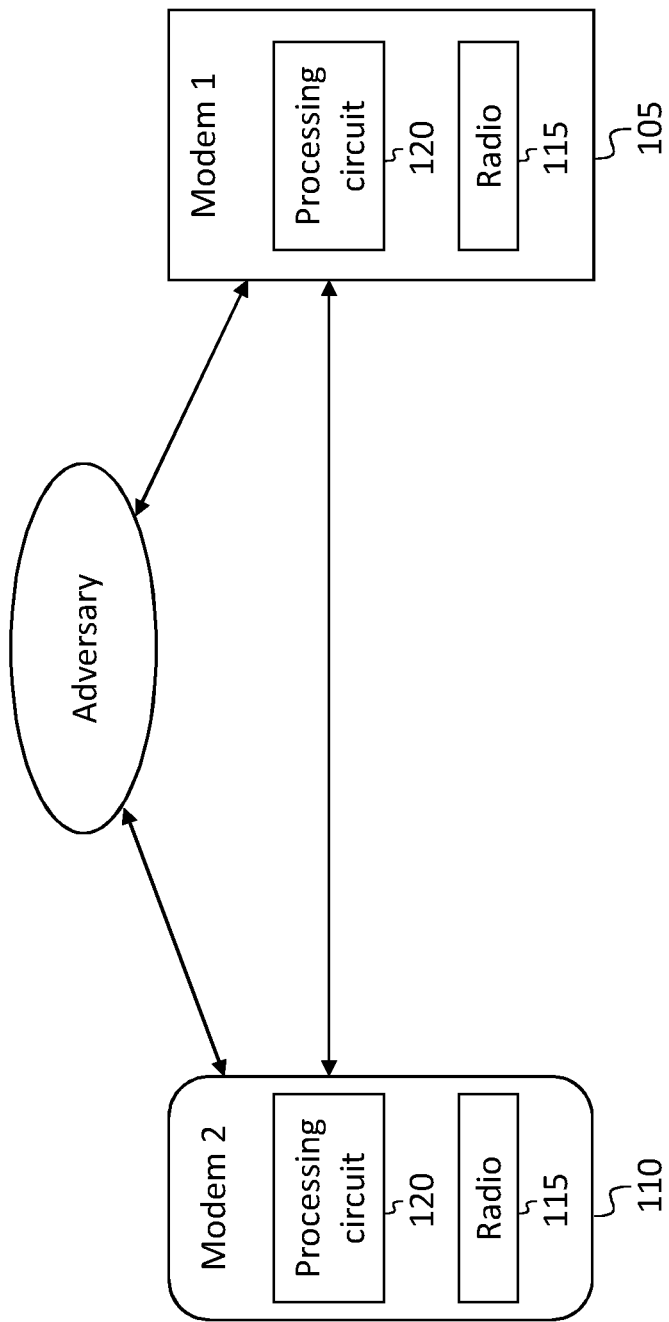
FIG. 1 is a block diagram of a wireless system and an adversary, according to an embodiment of the present disclosure.

Wireless control may be used, in a large variety of circumstances, to grant access to resources. For example, access cards may be used to grant access to locked facilities, wireless garage door openers may be used to open garage doors, and wireless remote controls may be used to unlock, and enable the operation of, automobiles. In such a configuration, a first modem may directly control access to the resource (e.g., unlocking the doors to the automobile, or enabling it to be started), and a second modem may be in the possession of a person who is entitled to access the resource. When the person activates the second modem (e.g., by pressing a button on the second modem) the second modem may transmit, to the first modem, an instruction to grant access to the resource, and the second modem may respond by granting access to the resource. As shown in FIG. 1, the first modem 105 and the second modem 110 may each include a radio 115 and a processing circuit 120 (discussed in further detail below). In some circumstances the second modem may grant access to the resource when the first modem is sufficiently close to the first modem. For example, when the owner of an automobile is sufficiently close to the automobile (e.g., less than a threshold range from the automobile, the threshold range being between 1 foot and 30 feet), the second modem may grant access to the automobile.

The ranging operation that allows the second modem to determine how distant the first modem is may be vulnerable to attack unless suitable measures are taken. For example, referring to FIG. 1, an adversary may monitor the communications between the first modem 105 and the second modem 110, and overlay one or more adulterated ranging transmissions on the transmissions between the first modem 105 and the second modem 110, so that at least one of the received ranging signals, including overlaid adulterated ranging transmissions, cause the receiving modem to estimate a smaller range than the true range, causing the first modem 105 to underestimate the range to the second modem and to grant access when the true range is not less than the threshold range.

In some embodiments, feedback of channel characteristics may be employed to secure ranging transmissions between modems. For example, the first modem 105 and the second modem 110 may both be Wi-Fi modems, connected by a Wi-Fi connection. The second modem 110 may transmit a first ranging training signal (e.g., a first Wi-Fi ranging training sequence) to the first modem 105. The first modem 105 may perform channel estimation using the first ranging training signal, to generate a first channel estimate, and to generate one or more first estimates of channel metrics based on the first channel estimate, and perform feedback of one or more of the first estimates of channel metrics based on the channel estimate (as discussed in further detail below), e.g., it may send the one or more first estimates of channel metrics to the second modem 110. For example, the first channel estimate may be an estimated channel impulse response (or an estimated channel frequency response), and an estimate of a first channel metric may be the difference between an estimated time of arrival and a phase shift time of arrival (as discussed in further detail below). The feedback may be performed using a secure (encrypted) link (e.g., a higher-layer link such as a media access control (MAC) layer link) between the first modem 105 and the second modem 110.

The second modem 110 may also perform channel estimation (e.g., using a second ranging training signal transmitted, to the second modem 110, by the first modem 105), to generate a second channel estimate, and to generate one or more second estimates of channel metrics that are based on the second channel estimate. The second modem 110 may also perform feedback of one or more of the second estimates of channel metrics based on the second channel estimate, e.g., it may send the one or more second estimates of channel metrics to the first modem 105. Each of the first modem 105 and the second modem 110 may use the same antenna for receiving and transmitting, and the ranging may be performed in a rapid wireless time domain duplex (TDD) exchange; as a result, the propagation channel may be substantially the same in both directions. For example, the exchange of ranging training signals may be completed during a time interval having a length between 0.01 ms and 100 ms (e.g., during an interval having a length of 1 ms). As such, the channel for the first ranging training signal may be substantially the same as the channel for the second ranging training signal.

When an adversary overlays an adulterated ranging transmission on the first ranging training signal (to produce a signal referred to herein as the "combined signal received by the first modem 105"), this overlaying may, in general, (i) in accordance with the wishes of the adversary, alter the range estimate that the first modem 105 generates from the combined signal received by the first modem 105, and (ii) alter other aspects of the first channel estimate in a manner that is not readily predicted by the adversary. The latter effect may be, from the perspective of the adversary, an undesirable side effect of the overlaying, but it may be difficult for the adversary to avoid, because the adversary may not have sufficient information about the channel between the first modem 105 and the second modem 110 to (i) predict the effect, of the presence of the overlay signal, on the first channel estimate and to (ii) create an overlay signal that alters only the estimated range of the second modem 110 without altering other aspects the first channel estimate.

The adversary may also overlay an adulterated ranging transmission on the second ranging training signal (to produce a signal referred to herein as the "combined signal received by the second modem 105"). This overlaying may (i) alter the range estimate that the second modem 105 generates from the combined signal received by the second modem 105, and (ii) alter other aspects of the second channel estimate. As in the case of the overlaying on the first ranging training signal, the overlaying on the second ranging training signal may alter the second channel estimate in a manner that is not readily predicted or controlled by the adversary, because the adversary may not have sufficient information about the channel between the first modem 105 and the second modem 110 to predict or avoid such alteration.

The first modem 105 may determine whether to grant or deny access to the resource based on (i) the estimated range of the second modem 110 and on (ii) whether the one or more second estimates of channel metrics received from the second modem 110 match the one or more first estimates of channel metrics (as assessed using one or more suitable similarity criteria). If the estimated range of the second modem is greater than the threshold range, the first modem 105 may deny access to the resource, because the person in possession of the second modem 110 may not be sufficiently close to use the resource. If the one or more second estimates of channel metrics received from the second modem 110 do not match the one or more first estimates of channel metrics, then the first modem 105 may deny access to the resource, because the discrepancy may be caused by an adversary having overlaid adulterated ranging transmissions on the first ranging training signal or on the second ranging training signal, or both.

Each channel metric may be based on two or more channel characteristics. The channel characteristics may be based on the channel estimates, and the channel characteristics may be selected to be sufficiently rich to be affected, in a manner that is difficult to predict, by the overlaying, on the training signal, of a signal generated by an adversary. In some embodiments, the first channel metric is a measure of the difference (e.g., it may be proportional to the difference, or a function of the difference) between two channel characteristics, (i) the time of arrival of a ranging training signal (e.g., of the first ranging training signal or the second ranging training signal) transmitted through the channel and (ii) the phase shift time of arrival of the ranging training signal. The first modem 105 may, upon receipt of the first ranging training signal, estimate the time of arrival and the phase shift time of arrival, and calculate the difference, to form a first estimate of the first channel metric. Similarly, the second modem 110 may, upon receipt of the second ranging training signal, estimate the time of arrival and the phase shift time of arrival, and calculate the difference, to form a second estimate of the first channel metric. A similarity criterion used to determine whether the first estimate of the first channel metric matches the second estimate of the first channel metric may be a criterion that is met if the difference between the first estimate of the first channel metric is less than a threshold time difference, where the threshold is, e.g., between 0.1 ns and 100.0 ns, e.g., 10.0 ns. In other embodiments, the channel characteristics may be, e.g., the mean of a plurality of elements of the estimated channel frequency response, or the standard deviation of a plurality of elements of the estimated channel frequency response. As used herein, the "phase shift time of arrival" is a timing or time-of-arrival metric for, for example, an orthogonal frequency division multiplexing (OFDM) symbol. When an OFDM symbol is delayed or otherwise shifted in time, then a frequency domain channel estimate formed using that time-shifted OFDM symbol will have a frequency dependent phase applied to it. It will be a phase that is linear in the frequency in the channel estimate with a slope that is linearly dependent on the delay or shift in time of the OFDM symbol. Therefore the slope of this phase shift per frequency in the channel estimate can be used as a metric of the time of arrival of the OFDM symbol.

Figure 2:
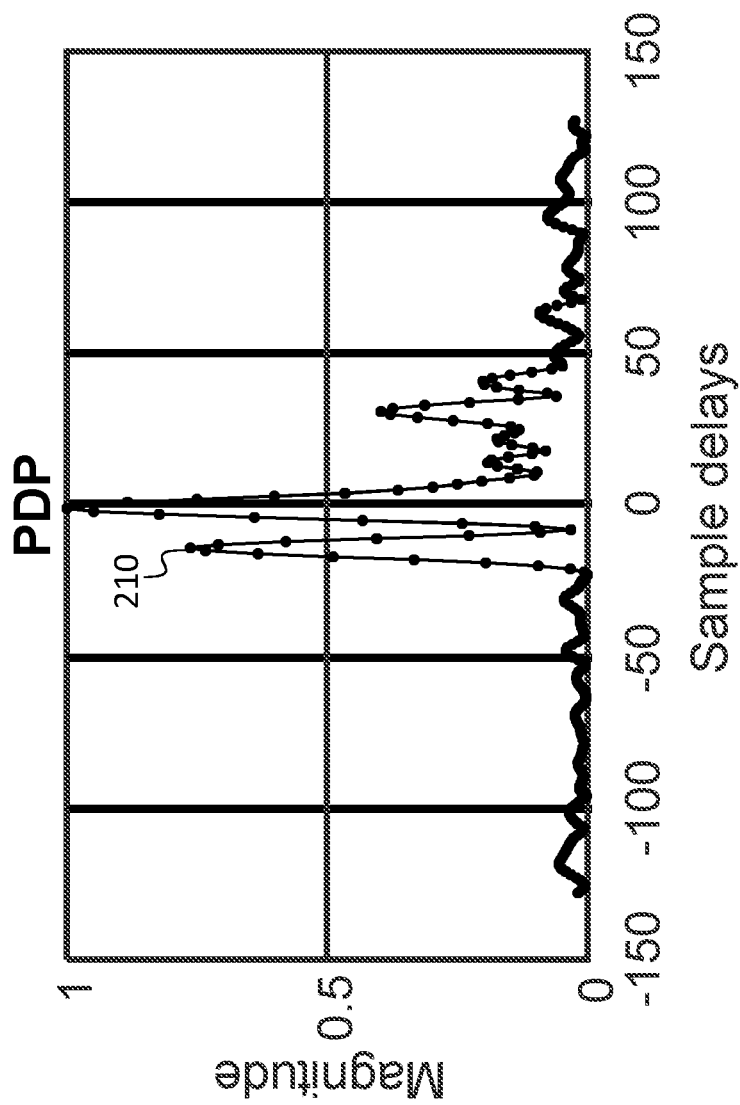
FIG. 2 is a graph of a power delay profile, according to an embodiment of the present disclosure.

FIG. 2 shows an example of a power delay profile (PDP) corresponding to the received first ranging training signal. The power delay profile may be the magnitude of an estimated channel impulse response, the estimated channel impulse response being the Fourier transform of an estimated channel frequency response. The estimated time of arrival of the first ranging training signal may be estimated based on the first significant peak 210 in the power delay profile.

Figure 3:
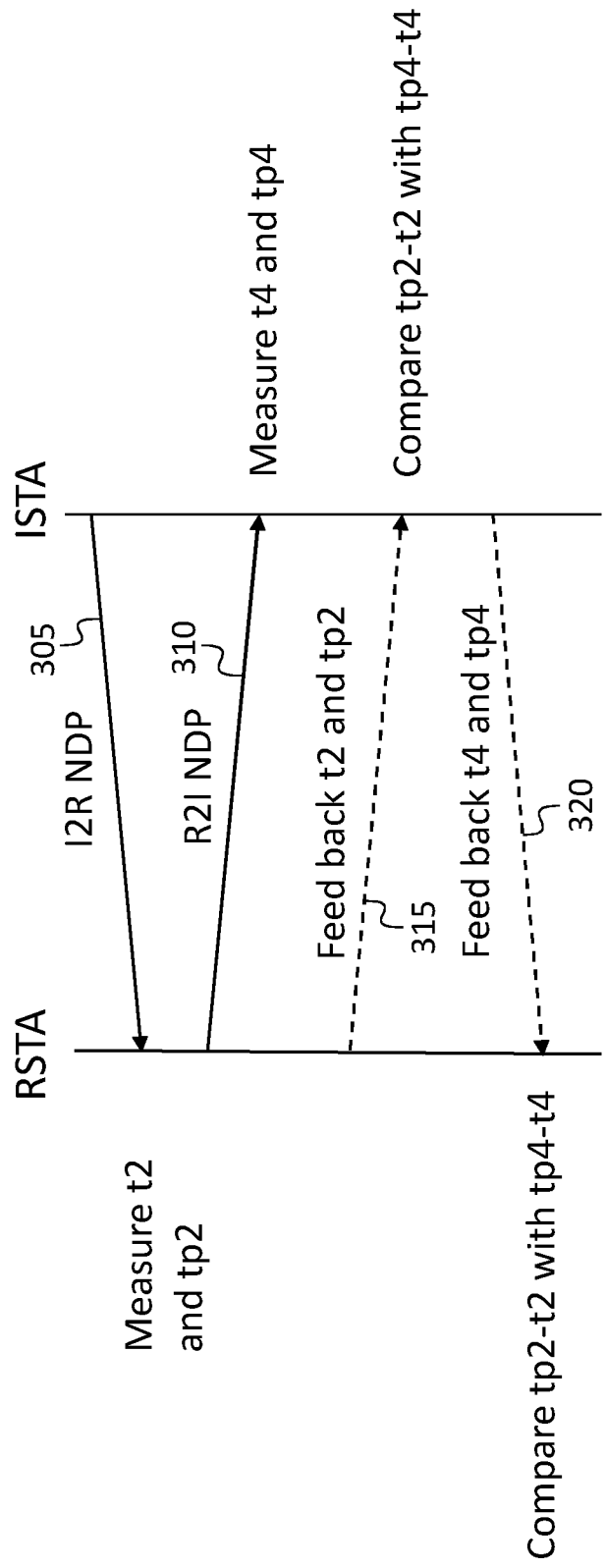
FIG. 3 is a message exchange sequence diagram for a wireless system, according to an embodiment of the present disclosure.

FIG. 3 shows a sequence of exchanged ranging training signals between an initiating station (ISTA) and a responding station (RSTA) connected by a Wi-Fi connection. At 305, the ISTA sends a first ranging training signal (e.g., an ISTA to RSTA null data packet (I2R NDP)) to the RSTA, and the RSTA estimates or measures the time of arrival (t2) and the phase shift time of arrival (tp2). At 310, the RSTA then sends a second ranging training signal (e.g., an RSTA to ISTA null data packet (R2I NDP)) to the ISTA, and the ISTA estimates or measures the time of arrival (t4) and the phase shift time of arrival (tp4). At 315, the RSTA sends, to the ISTA, (i) the RSTA's estimate (t2) of the time of arrival, at the RSTA, of the ISTA to RSTA null data packet and (ii) the RSTA's estimate (tp2) of the phase shift time of arrival, at the RSTA, of the ISTA to RSTA null data packet. The ISTA compares the difference (tp2−t2) (the difference between (i) the RSTA's estimate of the time of arrival and (ii) the RSTA's estimate of the phase shift time of arrival) to the difference (t4−tp4) (the difference between (i) the ISTA's estimate of the time of arrival and (ii) the ISTA's estimate of the phase shift time of arrival), and if the difference between the two differences exceeds the threshold time difference, it determines that an attack may have been made on the link and denies access to the resource (either directly, if it is in direct control of the resource, or indirectly, by instructing the RSTA not to grant access to the resource). Similarly, at 320, the ISTA sends, to the RSTA, (i) the ISTA's estimate (t4) of the time of arrival, at the ISTA, of the RSTA to ISTA null data packet and (ii) the ISTA's estimate (tp4) of the phase shift time of arrival, at the ISTA, of the RSTA to ISTA null data packet. The RSTA also compares the difference (tp2−t2) to the difference (t4−tp4), and if the difference between the two differences exceeds the threshold time difference, it determines that an attack may have been made on the link and denies access to the resource (either directly, if it is in direct control of the resource, or indirectly, by instructing the ISTA not to grant access to the resource).

FIG. 4 shows a modified frame structure for a location measurement reporting (LMR) frame that may be employed for feeding back the estimated phase shift time of arrival, and, optionally, an estimated error in the estimated phase shift time of arrival. Two new fields 410 may be added, to the standard format for an LMR frame, for this purpose.

In some embodiments, the ranging training signals may be encrypted, providing an additional layer of security. Analogous methods may be employed in other wireless protocols (e.g., the channel may sounded or estimated, the range may be estimated, and authentication may be performed), such as Bluetooth™ or 5G. In protocols other than Wi-Fi, different terminology may be used to refer to the ranging training signal (e.g., they may be referred to as "reference signals"), but the same principles as those disclosed herein may be employed to provide security for ranging.

Figure 5:
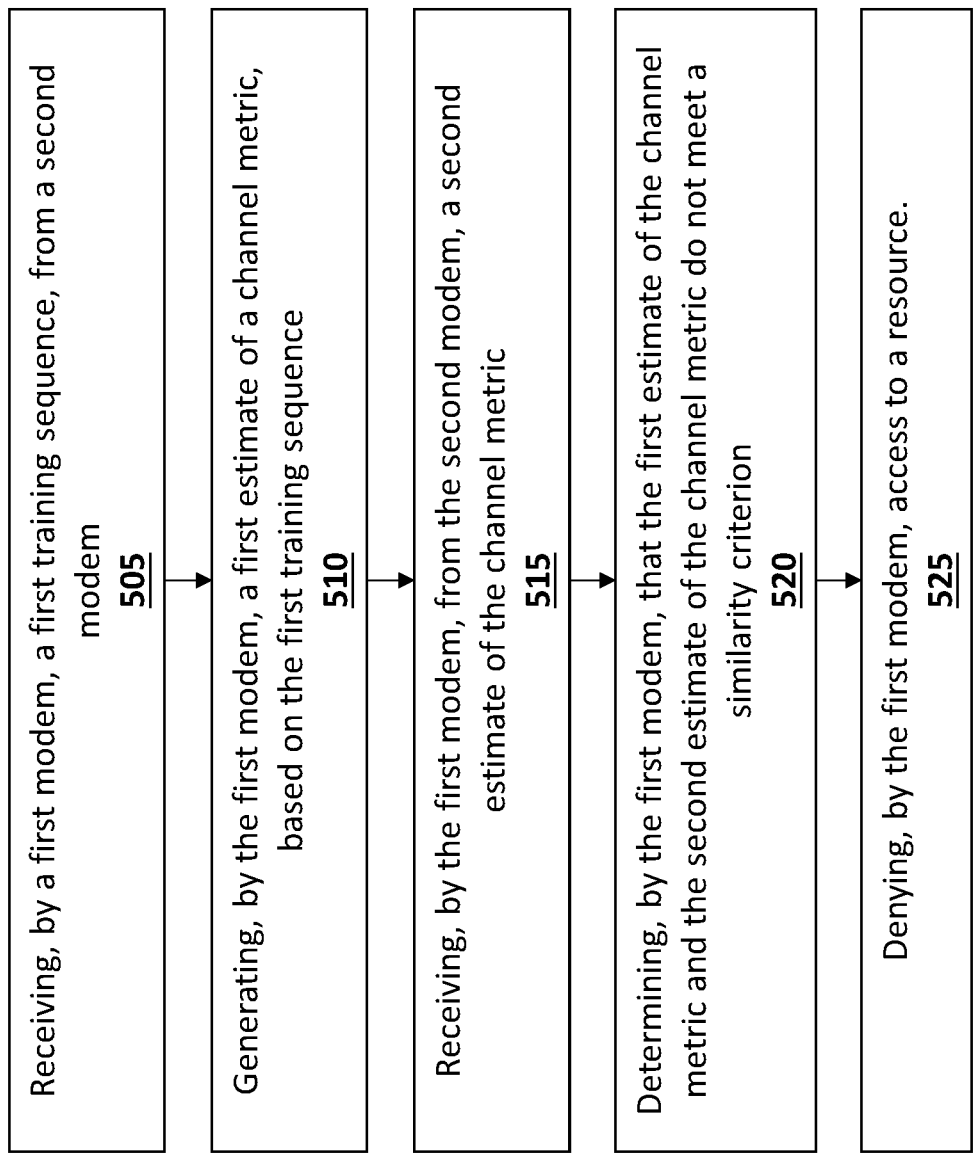
FIG. 5 is a flow chart of a method, according to an embodiment of the present disclosure.

FIG. 5 is a flowchart of a method, in some embodiments. The method includes, receiving, at 505, by a first modem, a first training signal, from a second modem; generating, at 510, by the first modem, a first estimate of a channel metric, based on the first training signal; receiving, at 515, by the first modem, from the second modem, a second estimate of the channel metric; determining, at 520, by the first modem, that the first estimate of the channel metric and the second estimate of the channel metric do not meet a similarity criterion; and denying, at 525, by the first modem, access to a resource.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

A processing circuit may perform some or all of the methods described herein. For example, the processing circuit 120 of the first modem 105 may receive (via the radio 115 of the first modem 105), the first ranging training signal, and it may grant or deny (via interface circuits to which the first modem 105 may be connected) access to the resource. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for secure ranging between modems have been specifically described and illustrated herein, many modifications and variations will be apparent to those skilled in the art. Accordingly, it is to be understood that a system and method for secure ranging between modems constructed according to principles of this disclosure may be embodied other than as specifically described herein. The invention is also defined in the following claims, and equivalents thereof.

What is claimed is:

1. A method, comprising:
   receiving, by a first modem, a first training signal, from a second modem;
   generating, by the first modem, a first estimate of a channel metric, based on the first training signal, the first estimate of the channel metric being based on a time of arrival and a phase shift time of arrival;
   receiving, by the first modem, from the second modem, a second estimate of the channel metric;
   determining, by the first modem, that the first estimate of the channel metric and the second estimate of the channel metric do not meet a similarity criterion indicative of a degree of similarity between the first estimate of the channel metric and the second estimate of the channel metric; and
   denying, by the first modem, access to a resource.

2. The method of claim 1, further comprising sending, by the first modem, a second training signal, wherein the second estimate of the channel metric is based on the second training signal.

3. The method of claim 2, further comprising generating, by the second modem, the second estimate of the channel metric.

4. The method of claim 1, wherein the first estimate of the channel metric is based on a first estimate of a first channel characteristic and a first estimate of a second channel characteristic.

5. The method of claim 4, wherein the first estimate of the first channel characteristic is an estimated time of arrival of the first training signal.

6. The method of claim 5, wherein the first estimate of the second channel characteristic is an estimated phase shift time of arrival of the first training signal.

7. The method of claim 6, wherein the first estimate of the channel metric is a measure of the difference between the estimated time of arrival of the first training signal and the estimated phase shift time of arrival of the first training signal.

8. The method of claim 7, wherein:
   the second estimate of the channel metric is a measure of the difference between the estimated time of arrival of a second training signal and the estimated phase shift time of arrival of the second training signal, the second training signal being a training signal sent by the first modem and received by the second modem; and
   the similarity criterion is a criterion that is not met when the difference between the first estimate of the channel metric and the second estimate of the channel metric exceeds a set threshold.

9. The method of claim 5, wherein the first estimate of the second channel characteristic is a mean of a plurality of elements of an estimated channel frequency response.

10. The method of claim 5, wherein the first estimate of the second channel characteristic is a standard deviation of a plurality of elements of an estimated channel frequency response.

11. A system, comprising:
    a first modem, comprising:
       a radio; and
       a processing circuit,
    the processing circuit being configured to:
       receive a first training signal, from a second modem;
       generate a first estimate of a channel metric, based on the first training signal, the first estimate of the channel metric being based on a time of arrival and a phase shift time of arrival;
       receive, from the second modem, a second estimate of the channel metric;
       determine that the first estimate of the channel metric and the second estimate of the channel metric do not meet a similarity criterion indicative of a degree of similarity between the first estimate of the channel metric and the second estimate of the channel metric; and
       deny access to a resource.

12. The system of claim 11, wherein the processing circuit is further configured to send a second training signal, wherein the second estimate of the channel metric is based on the second training signal.

13. The system of claim 12, further comprising the second modem, the second modem being configured to generate the second estimate of the channel metric.

14. The system of claim 11, wherein the first estimate of the channel metric is based on a first estimate of a first channel characteristic and a first estimate of a second channel characteristic.

15. The system of claim 14, wherein the first estimate of the first channel characteristic is an estimated time of arrival of the first training signal.

16. The system of claim 15, wherein the first estimate of the second channel characteristic is an estimated phase shift time of arrival of the first training signal.

17. The system of claim 16, wherein the first estimate of the channel metric is a measure of the difference between the estimated time of arrival of the first training signal and the estimated phase shift time of arrival of the first training signal.

18. The system of claim 17, wherein:
    the second estimate of the channel metric is a measure of the difference between the estimated time of arrival of a second training signal and the estimated phase shift time of arrival of the second training signal, the second training signal being a training signal sent by the first modem and received by the second modem; and
    the similarity criterion is a criterion that is not met when the difference between the first estimate of the channel metric and the second estimate of the channel metric exceeds a set threshold.

19. The system of claim 15, wherein the first estimate of the second channel characteristic is a mean of a plurality of elements of an estimated channel frequency response.

20. A system, comprising:
a first modem, comprising:
- a radio; and
- means for processing, the means for processing being configured to:
- receive a first training signal, from a second modem;
- generate a first estimate of a channel metric, based on the first training signal, the first estimate of the channel metric being based on a time of arrival and a phase shift time of arrival;
- receive, from the second modem, a second estimate of the channel metric;
- determine that the first estimate of the channel metric and the second estimate of the channel metric do not meet a similarity criterion indicative of a degree of similarity between the first estimate of the channel metric and the second estimate of the channel metric; and
- deny access to a resource.

* * * * *